United States Patent [19]

Figiel

[11] Patent Number: 4,752,336

[45] Date of Patent: Jun. 21, 1988

[54] EVAPORATIVE CORROSION PREVENTIVE FILM

[75] Inventor: Francis J. Figiel, Boonton, N.J.

[73] Assignee: Allied-Signal Inc., Morris Township, Morris County, N.J.

[21] Appl. No.: 46,078

[22] Filed: May 5, 1987

[51] Int. Cl.$^4$ .................. C09D 5/08; B32B 15/04; B05D 1/18
[52] U.S. Cl. .................. 106/14.23; 106/14.05; 106/14.41; 106/14.24; 427/154; 427/155; 427/156; 428/467
[58] Field of Search .................. 106/14.05, 14.41, 271, 106/14.23, 14.24; 252/387, 396; 427/154, 155, 156; 148/6; 428/467

[56] References Cited

U.S. PATENT DOCUMENTS

| | | | |
|---|---|---|---|
| 4,157,991 | 6/1979 | Pilla | 106/14.27 |
| 4,166,151 | 8/1979 | Jahnke | 106/14.41 |
| 4,315,957 | 2/1982 | Hereth et al. | 427/155 |

*Primary Examiner*—Paul Lieberman
*Assistant Examiner*—Helene Kirschner
*Attorney, Agent, or Firm*—Jay P. Friedenson; Harold N. Wells

[57] ABSTRACT

Temporary corrosion protection for fresh metal surfaces may be obtained by depositing a thin film of a protective organic compound, particularly a fatty acid ester, from a solvent, preferably a fluorocarbon on the surface to be protected. The film-forming esters are chosen to be self-removing by evaporation so that no cleaning is needed before carrying out processes which require a clean metal surface.

10 Claims, No Drawings

EVAPORATIVE CORROSION PREVENTIVE FILM

FIELD OF THE INVENTION

This invention relates generally to preventing the corrosion of fresh metal surfaces for a short period of time.

BACKGROUND OF THE INVENTION

Corrosion of metal surfaces is a problem with many dimensions. Severe corrosion over long periods of time can destroy the integrity of metal structures. Consequently, various methods have been developed to prevent or limit the attack on metals. However, even a minor amount of corrosion on fresh metal surfaces can be a problem during the manufacturing of various types of equipment. Therefore, fresh metal surfaces may be protected temporarily until a more permanent protection can be provided or another manufacturing step is carried out. The degree of protection need not be great for short periods of time, but if temporary coatings are applied it is usually necessary to remove them before further processing of the metal. Depending upon the coating used, removing them may require solvents which present significant costs or disposal problems. Also, the coatings themselves may contain materials which should be avoided for environmental reasons. Consequently, there remains a need for improved temporary coatings for corrosion prevention.

The problems associated with such coatings are discussed in U.S. Pat. No. 4,315,957, which discloses a wax composition which can be removed by a steam-water mixture, thereby avoiding the use of solvents.

Various waxes, greases, soaps and related compounds have been used for temporary protection of fresh metal surfaces as is indicated in U.S. Pat. No. 4,315,957. It is characteristic of such materials that they can be fairly easily removed while more permanent coatings cannot.

Ideally, a temporary coating should provide corrosion protection for a short period, say about 1-7 days. The coating should be easy to apply and easy to remove, while avoiding materials which present environmental problems.

The present invention employs a different method than those discussed above and achieves the desired results, as will be seen in the description which follows.

SUMMARY OF THE INVENTION

Fresh metal surfaces may be provided with a temporary protective film which is self-removing by evaporation. The protective film will be only about 1-7 $\mu$m (micron) thick in most cases where the protection is to last at least about 48 hours. However, the film is sufficient to protect the metal surface for such a short period, after which the metal may be further processed or finished without it being necessary to clean off the protective film.

The film consists essentially of a protective organic compound, particularly a fatty acid ester. Such materials will protect the surface but have sufficient vapor pressure that the very thin film evaporates in a short time. Examples of such esters are isopropyl myristate, isopropyl palmitate, and the like.

Fluorocarbon solvents having atmospheric boiling points below about 50° C. are particularly useful as vehicles for the film-forming compounds. Examples of such solvents are trichlorotrifluoroethane, trichloromonofluoromethane, and the like. Other volatile liquid capable of dissolving the selected protective organic compound could be used.

DESCRIPTION OF THE PREFERRED EMBODIMENTS

The temporary protecting film is very thin, typically about 7 $\mu$m or less. Normal applications of waxes and the like on metal surfaces are substantially greater—perhaps 10–100 $\mu$m or more. While thick coatings may be protective, they must be cleaned off before the metal surface can be further processed in most manufacturing environments. As previously discussed, this requires the use of cleaning solutions at additional cost and leads to problems in disposing of the solvents and the coating. The thin coating of the invention has been found sufficient to protect metal surfaces for short periods and it is self-removing by evaporation. Consequently, it is possible to apply the film for protection of the metal and to continue processing without cleaning within a short period of time. Reapplication or heavier initial application of the film is possible in the event that longer protection is needed.

The film consists essentially of a protective organic compound having a low, but significant vapor pressure. For example, the preferred compounds boil between about 140° and 195° C. at 20 mmHg. Volatile fatty acid esters are particularly useful. Esters which satisfy this general criteria include isopropyl myristate, isopropyl palmitate, and the like. They are liquids at room temperatures and readily dissolved in a fluorocarbon or other suitable solvent. The preferred esters are non-toxic and readily available, however, analogous compounds which do not have all the advantages of the preferred compounds could find applications. For example, other esters of palmitic or myristate acids could be used, even though their properties are not as satisfactory as the isopropyl esters. Although the esters have a boiling point well above ambient temperatures, nevertheless, their vapor pressure is sufficient to result in the evaporation of a very thin film in a short period of time, generally about 48 hours or more. Higher boiling materials might form protective films but generally would evaporate too slowly and could require cleaning of the metal surface to which they were applied. Lower boiling materials may not provide sufficient protection since they would evaporate more rapidly and could leave little residue when the solvent evaporates. The ester selected would depend on a number of factors, such as availability, cost, toxicity and protective performance but they must have a suitable vapor pressure for the temperature at which they will be used. It may be desirable to use a mixture of esters having a range of boiling points in some situations.

While fatty acid esters have been found to be suitable, other protective organic compounds which meet the criteria could be employed.

Although the film consists essentially of the protective compound selected, it is not intended to exclude small amounts of other ingredients which may help to improve protection against corrosion such as inhibitors which could remain on the metal surface in subsequent processing.

As applied, the fatty acid esters are dissolved in a volatile fluorocarbon or other suitable solvent. The amount of the esters will be relatively small, about 0.01 to 1.0 weight percent, with the remainder being the solvent. When the solvent evaporates, the fatty acid ester film deposited will be about 7 μm or less.

Of the fluorocarbon solvents, certain types are particularly useful, since they combine the solvency and volatility needed for application of the protective films of the invention. The solvent should have a boiling point below about 50° C. and above about 20° C. Examples of such solvents are trichlorotrifluoroethane, trichloromonofluoromethane and the like.

EXAMPLE 1

A solution was prepared of 1 wt. % isopropyl palmitate (technical grade) in GENESOLV ® D ($C_2Cl_3F_3$) of Allied Corporation. Samples of steel plate 1 cm×2 cm×0.1 cm were cleaned by successive washing in chloroform, methanol and acetone to provide a fresh metal surface. The cleaned steel samples were dipped in the isopropyl palmitate solution for about 5 seconds, removed, and allowed to air dry. Analysis by XPS (x-ray photoelectron spectroscopy) showed that a very thin layer of isopropyl palmitate (about 1-2 μm) was on the surface. The steel samples were subjected to an accelerated corrosion test by exposing them to a temperature of 50° C. and a relative humidity of 96%. After 140 hours an untreated control sample was rusted and pitted over its entire surface, giving a brown overall appearance. In contrast, the coated samples had some random rust spots and the overall impression was of a reflective metallic finish.

EXAMPLE 2

A solution of 0.5 weight percent isopropyl myristate in GENESOLV ® A ($C_1C_3F$) of Allied Corporation is prepared and applied to sheet samples as in Example 1.

It will be understood by those skilled in the art that other solvents and protective compounds could be used. A predetermined film thickness would be established to provide the degree and time of protection required. The film thickness could be varied by adjusting the concentration of the protective compound and the method of application.

I claim:

1. A process for temporarily protecting metal surfaces from atmospheric corrosion which comprises applying a mixture of a protective organic compound wherein said organic compound is a fatty acid ester having a boiling point between about 140° and 195° C. at 20 mm Hg in a volatile fluorocarbon solvent having a boiling point below about 50° C. and above about 20° C. to the surface to be protected and evaporating the solvent to deposit a thin film of the protective organic compound, said organic compound being self-removing from said surface by evaporation within a predetermined period of time.

2. The process of claim 1 wherein said fatty acid ester is at least one member of the group consisting of isopropyl myristate and isopropyl palmitate.

3. The process of claim 1 wherein said fluorocarbon is trichlorotrifluoroethane or trichloromonofluoromethane.

4. The process of claim 1 wherein said mixture consists essentially of about 0.01 to 1.0 weight percent of said protective compound in 99.99 to 99.0 percent of said solvent.

5. The process of claim 1 wherein the mixture is applied in an amount sufficient to deposit a film of said ester having a thickness of about 1-7 μm.

6. A solution for temporarily protecting metal surfaces which consists essentially of about 0.01 to 1.0 weight percent of a fatty acid ester having a boiling point below about 195° C. at 20 mm Hg and 99.0 to 99.99 weight percent of a fluorocarbon solvent having a boiling point below about 50° C.

7. The solution of claim 6 wherein said fatty acid ester is at least one member of the group consisting of isopropyl myristate or isopropyl palmitate.

8. The solution of claim 6 wherein said fluorocarbon solvent is trichlorotrifluoroethane or trichloromonofluoromethane.

9. A self removing protective film having a thickness of about 1-7 μm disposed on a metal surface, said film consisting essentially of a protective organic compound wherein said organic compound is a fatty acid ester having a boiling point between about 140° and 195° C. at 20 mm Hg capable of evaporating in a predetermined period of time.

10. The protective film of claim 9 wherein said fatty acid ester is at least one member of the group consisting of isopropyl myristate and isopropyl palmitate.

* * * * *